(12) United States Patent
Aguilar

(10) Patent No.: US 11,342,692 B2
(45) Date of Patent: May 24, 2022

(54) MODULAR JUNCTION BOXES

(71) Applicant: Tomas M. Aguilar, Burbank, CA (US)

(72) Inventor: Tomas M. Aguilar, Burbank, CA (US)

( * ) Notice: Subject to any disclaimer, the term of this patent is extended or adjusted under 35 U.S.C. 154(b) by 0 days.

(21) Appl. No.: 15/931,365

(22) Filed: May 13, 2020

(65) Prior Publication Data
US 2021/0359433 A1     Nov. 18, 2021

(51) Int. Cl.
*H01R 4/02*     (2006.01)
*H01R 9/24*     (2006.01)
*H01R 13/70*    (2006.01)

(52) U.S. Cl.
CPC ......... *H01R 9/2408* (2013.01); *H01R 9/2416* (2013.01); *H01R 9/2458* (2013.01); *H01R 13/70* (2013.01)

(58) Field of Classification Search
CPC ... H01R 4/02; H01R 4/06; H01R 4/30; H01R 9/2408; H01R 9/2416; H01R 9/2458; H01R 13/11; H01R 13/05; H01R 13/16; H01R 13/46; H01R 13/66; H01R 13/70; H01R 25/16; H05K 13/0023
USPC ............ 174/50, 53, 64, 27, 28, 29; 439/535, 439/536, 596, 547
See application file for complete search history.

(56) References Cited

U.S. PATENT DOCUMENTS

| | | | |
|---|---|---|---|
| 4,924,032 A * | 5/1990 | Akins ....................... | H02G 3/00 174/53 |
| 5,525,754 A | 6/1996 | Akins | |
| 6,201,187 B1 * | 3/2001 | Burbine ............... | H01R 13/465 174/53 |
| 6,677,521 B2 | 1/2004 | Sumida et al. | |
| 6,870,099 B1 | 3/2005 | Schultz et al. | |
| 7,851,704 B2 * | 12/2010 | Fitch ........................ | H02G 3/00 174/53 |
| 8,794,982 B2 | 8/2014 | Yamamoto et al. | |
| 10,170,878 B1 | 1/2019 | Reulman, Sr. | |
| 2002/0185296 A1 | 12/2002 | Schultz | |
| 2006/0108137 A1 | 5/2006 | Smith | |
| 2006/0216988 A1 * | 9/2006 | Scott ...................... | H01R 43/24 439/535 |
| 2010/0288526 A1 * | 11/2010 | Meyer .................... | H02G 3/123 174/58 |
| 2012/0322300 A1 * | 12/2012 | Arrias .................... | H02G 3/086 439/536 |
| 2014/0174781 A1 | 6/2014 | Do | |

(Continued)

FOREIGN PATENT DOCUMENTS

EP     2678903 A2     1/2014

*Primary Examiner* — William H. Mayo, III

(57) ABSTRACT

Modular junction boxes are disclosed. In one embodiment, a junction box for convenient modular industrial wiring is provided having a plurality of walls defining a first internal space of the junction box and at least one open face, a first connection area located on a first external face of the junction box having a first opening for receiving at least three electrical wires, a bus bar stack located in the first internal space of the junction box, a removable junction device having at least one contact support being mechanically and electrically attachable to the bus bar stack, and wherein when the junction device is attached to the bus bar stack, the junction device is electrically connected through the at least one contact support to one of at least three input openings of the bus bar stack.

20 Claims, 11 Drawing Sheets

(56) References Cited

U.S. PATENT DOCUMENTS

| | | | |
|---|---|---|---|
| 2015/0000972 A1* | 1/2015 | Mayer | H02G 3/16 174/560 |
| 2017/0179657 A1* | 6/2017 | Wolfson | H01R 13/665 |
| 2017/0338633 A1 | 11/2017 | Gong | |
| 2018/0287272 A1 | 10/2018 | Garton et al. | |

* cited by examiner

MODULAR JUNCTION BOXES

FIELD OF THE INVENTION

The present invention generally relates to junction boxes and more specifically to devices for electrical junction boxes with modular components.

BACKGROUND

A standard electrical junction box may be used to house electrical connections. For example, electrical connections may be used to connect electricity from a power source to an electrical device (e.g., a lamp) requiring electrical power. A standard electrical junction box may also serve as the container for the space behind electrical fittings such as power outlets, sockets, light switches, or other electrical fixtures. In addition, standard electrical junction boxes may be designed for either surface mounting or to be embedded within a surface. For example, standard electrical junction boxes may be attached to, or within, surfaces such as a wall, a ceiling, or a floor.

SUMMARY OF THE INVENTION

The various embodiments of the present modular junction boxes contain several features, no single one of which is solely responsible for their desirable attributes. Without limiting the scope of the present embodiments, their more prominent features will now be discussed below. In particular, the modular junction boxes will be discussed in the context of wall junction boxes such as, but not limited to, one gang (may also be referred to as a "single gang") and/or two gang junction boxes. However, the use of a wall junction boxes are merely exemplary and various other embodiments may be utilized for modular junction boxes as appropriate to the requirements of a specific application in accordance with various embodiments of the invention. After considering this discussion, and particularly after reading the section entitled "Detailed Description," one will understand how the features of the present embodiments provide the advantages described here.

One aspect of the present embodiments includes the realization that with current junction boxes other than the present embodiments, correctly wiring a junction box can be labor intensive, dangerous, and/or error prone. For example, multiple wires must be securely and accurately connected through junction boxes to nondescript connection points on electrical components or to additional wires within the junction box in order to avoid electrical hazards and ensure proper functionality. The present embodiments solve these problems by providing modular junction boxes having designated connection points, separated electrical zones, and pre-wired components. The present embodiments thus advantageously enable junction boxes to be quickly and accurately wired to interchangeable electrical components. The present embodiments provide these advantages and enhancements, as described below.

In a first aspect, a junction box for convenient modular industrial wiring is provided, the junction box comprises a plurality of walls defining a first internal space of the junction box and at least one open face, a first connection area located on a first external face of the junction box, the first connection area comprising a first opening for receiving at least three electrical wires, a bus bar stack located in the first internal space of the junction box, where the bus bar stack comprises at least three input openings aligned with the first opening, each of the at least three input openings comprising a connector for receiving an electrical wire and holding the electrical wire stationary while conducting electricity from the electrical wire to the bus bar stack, and at least three output openings facing towards the first internal space, each of the at least three output openings comprising a mechanical connector for conducting electricity from the bus bar stack to an electrical contact support and further securely holding the contact support within the opening, a removable electrical component comprising at least one contact support, the at least one contact support being mechanically and electrically attachable to one of the at least three output openings of the bus bar stack, and where when the junction device is attached to the bus bar stack, the junction device is electrically connected through the at least one contact support to one of the at least three input openings.

In an embodiment of the first aspect, the first opening receives a non-metallic sheathed cable comprising at least two insulated conductors.

In another embodiment of the first aspect, the first external wall has a set of markings adjacent the first connection area corresponding to a correct orientation of the at least three wires prior to being inserted into the first connection area.

In another embodiment of the first aspect, the first opening further comprises a clamp for securing the at least three wires in the first opening.

In another embodiment of the first aspect, the clamp further comprises at least two clamp settings corresponding to at least two opening dimensions.

In another embodiment of the first aspect, the at least three input openings further comprise a flexible wire gate wherein when a wire is pushed into the flexible wire gate, the flexible wire gate deforms to allow the wire to pass through, and wherein when the wire is pulled out, the flexible wire gate resists the movement of the wire.

In another embodiment of the first aspect, the bus bar stack further comprises at least three bus bar layers.

In another embodiment of the first aspect, at least one of the at least three bus bar layers extends along the interior of each of the plurality of walls.

In another embodiment of the first aspect, each of the at least three bus bar layers of the bus bar stack further comprise a hollow rectangular volume with electrically conductive sides.

In another embodiment of the first aspect, the hollow rectangular volume is formed by two opposing concave sides and two substantially flat sides, and wherein one of the at least three input openings are located on a first substantially flat side, one of the at least three output openings are located on a second substantially flat side opposite the first substantially flat side, and the two remaining opposing sides form a concave shape toward a center of the rectangular volume.

In another embodiment of the first aspect, the two opposing concave sides further comprise a set of matching cuts on each of the two opposing concave sides running from the first substantially flat side to the second substantially flat side.

In another embodiment of the first aspect, the bus bar stack further comprises at least two electrically insulated separation layers separating the at least three bus bar layers from each other, wherein when a first wire is inserted into a first layer of the bus bar stack and a second wire is inserted into a second layer of the bus bar stack, the first and second wires do not complete a circuit.

In another embodiment of the first aspect, the at least two electrically insulated separation layers are substantially rigid.

In another embodiment of the first aspect, the junction box further comprises a second connection area located on a second external face of the junction box adjacent the first external face, the second connection area comprising a second opening for receiving at least three electrical wires.

In another embodiment of the first aspect, the junction box further comprises a push-in fastener for attaching the removable electrical component to the open face of the junction box, wherein the removable electrical component may be securely attached by applying a force to the removable electrical component towards the junction.

In another embodiment of the first aspect, the removable electrical component further comprises a housing around the at least one contact support, and wherein the housing allows for the removable electrical component to be attached to the bus bar stack from a single orientation.

In another embodiment of the first aspect, the junction box further comprises at least one anchor located on an external wall of the junction box for securely attaching the junction box to a separate surface.

In another embodiment of the first aspect, the removable electrical component further comprises a light switch.

In another embodiment of the first aspect, the removable electrical component further comprises an electrical outlet.

In another embodiment of the first aspect, the removable electrical component further comprises a jumper for connecting a first location of the bus bar stack to a second location of the bus bar stack.

BRIEF DESCRIPTION OF THE DRAWINGS

The various embodiments of the present modular junction boxes will now be discussed in detail with an emphasis on highlighting the advantageous features. These embodiments depict the novel and non-obvious modular junction boxes shown in the accompanying drawings, which are for illustrative purposes only. These drawings include the following figures.

DETAILED DESCRIPTION OF THE DRAWINGS

Figure 1:
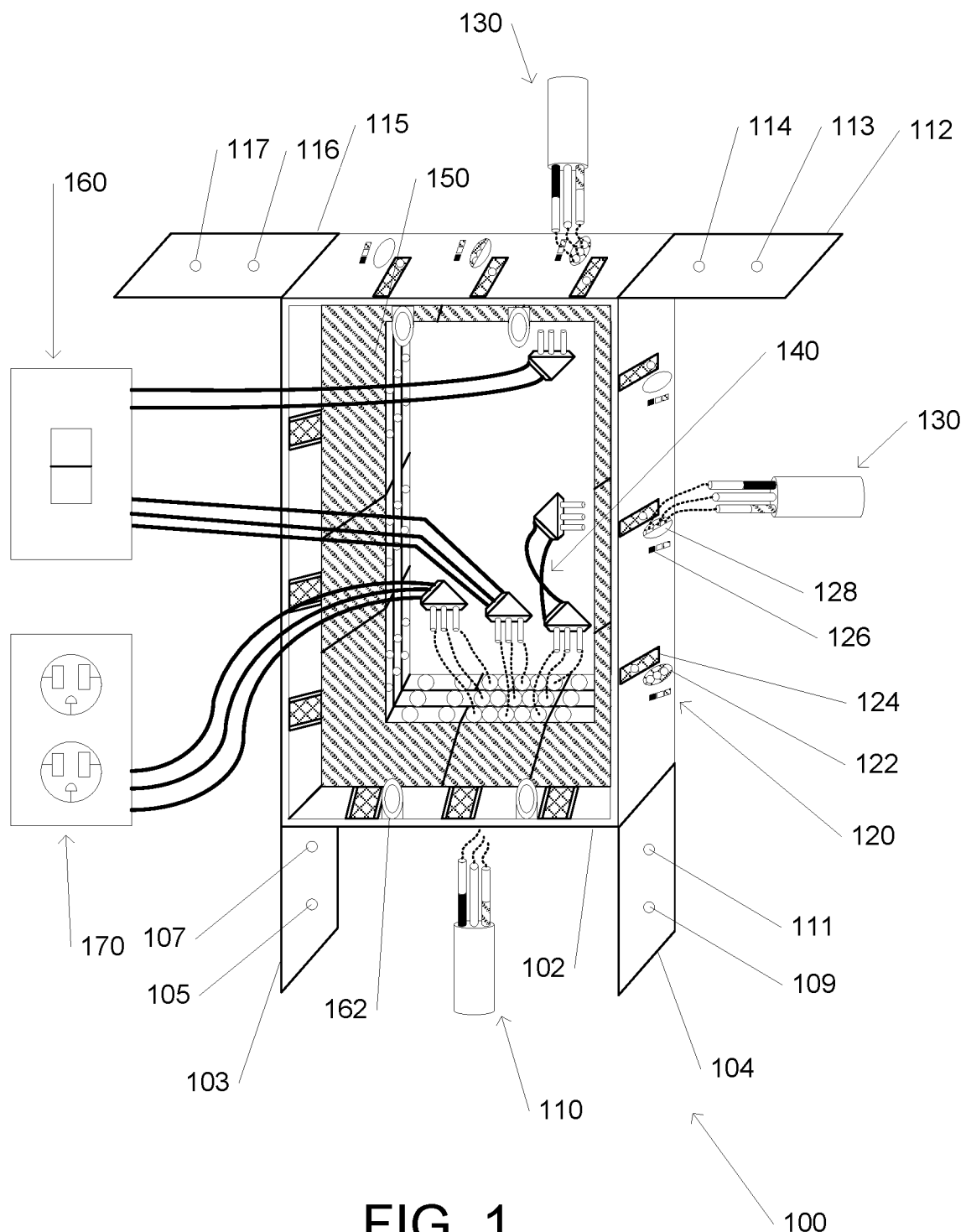
FIG. 1 is a front perspective view of a modular junction box assembly in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, modular junction boxes for quick wiring electrical components are illustrated. In many embodiments, a modular junction box may have multiple recesses on the outside capable of receiving and securely holding electrical wires. In various embodiments, the accepted electrical wires may be a bundle of wires such as, but not limited to, a non-metallic sheathed cable leading to another junction box or a circuit breaker panel. In several embodiments, the modular junction box may have multiple bus bars capable of distributing electricity around the inside of the junction box. In a variety of embodiments, some bus bars may be connected throughout the modular junction box while other bus bars may be separated to create distinct electrical control zones. In several embodiments, the modular junction box may be configured to receive multiple types of pre-wired electrical components such as, but not limited to, switches, outlets and/or jumpers. Modular junction box assemblies for quickly wiring components in accordance with embodiments of the invention are further discussed below.

Modular Junction Box Assemblies

Junction box assemblies may be utilized to house the connections between multiple incoming and outgoing wires as well as various electrical fittings such as, but not limited to, power outlets, sockets, light switches, and/or other electrical fixtures. A front perspective view of a modular junction box assembly in accordance with an embodiment of the invention is illustrated in FIG. 1. The assembly 100 may include a housing 102 that may form the overall structure of the assembly 100. In some embodiments, the housing 102 may be made from a variety of materials such as, but not limited to, plastic and/or metal. In many embodiments, the housing 102 may be made from materials that increase the functionality of the junction box assemblies. For example, in some embodiments, the housing 102 may be made from one or more fire retardant materials to reduce the probability of the junction box assembly catching on fire. In some embodiments, the housing 102 may be made from materials that draws heat away from the components within the modular junction box assembly thereby acting as a heatsink to maintain and/or improve electrical functionalities.

In some embodiments, the housing 102 may be affixed to a structure (e.g., a wall) using one or more anchors 103, 104, 112, 115. For example, the housing may include a first anchor 103, a second anchor 104, a third anchor 112, and a fourth anchor 115. In some embodiments, the housing 102 may be affixed to surfaces such as, but not limited to, interior and/or exterior walls, ceilings, and/or floors. In some embodiments, the housing 102 may be affixed within a wall and affixed to structural supports such as, but not limited to, wood or metal frames. In some embodiments, the anchors 103, 104, 112, 115 may be flaps extending from the housing 102. In various embodiments, the first anchor 103 may include a first hole 105 and a second hole 107 that allows for one or more fasteners to pass through the first anchor 103 and into a structure thereby affixing the housing 102 to the structure. Likewise, the second anchor 104 may include a first hole 109 and a second hole 111 that allows for one or more fasteners to pass through the second anchor 104 and into a structure thereby affixing the housing 102 to the structure. Similarly, the third anchor 112 may include a first hole 113 and a second hole 114 that allows for one or more fasteners to pass through the third anchor 112 and into a structure thereby affixing the housing 102 to the structure. In many embodiments, the fourth anchor 115 may include a first hole 116 and a second hole 117 that allows for one or more fasteners to pass through the fourth anchor 115 and into a structure thereby affixing the housing 102 to the structure. In other embodiments, the anchors 103, 104 may be flush against the sides of the housing 102 allowing for the use of fasteners and/or an extended rail system. In several embodiments, other methods known to one of skill in the art may be used for securing the housing 102 to a structure.

In many embodiments, the housing 102 may include one or more connection areas 120 where one or more electrical wires 110, 130 may be connected to the assembly 100, as further described below. In some embodiments, the one or more connection areas 120 may include an opening 122 for receiving the one or more electrical wires 110, 130 a clamp 128 to hold the one or more wires 110, 130 in place, and a clamp slider 124 to control the clamp 128, as further described below. In addition, in some embodiments, the one or more connection areas 120 may also include a set of markings 126 adjacent to the opening 120 indicating the proper orientation for the electrical wires 110, 130. For example, the set of markings 126 may include colors and/or patterns corresponding to standard wire insulator colors. Similarly, the set of markings 126 may be letters corresponding to the intended wire function such as, but not limited to, "H" for hot, "N" for neutral, and "G" for ground.

In reference to FIG. 1, the assembly 100 may also include a bus bar stack 150 as further described below. In some embodiments, the bus bar stack 150 may accept connections from multiple types of electrical components such as, but not limited to, a jumper 140, a light switch 160, and/or an electrical outlet 170, as further described below. In many embodiments, the housing 102 may be large enough to contain one or more electrical components. For example, the housing 102 may accommodate single, double, triple, quadruple, etc. gangs of electrical components. In some embodiments, the electrical components may be attached to the housing 102 using a push-in fastener 162 as further described below.

Although specific modular junction box assemblies for installing, connecting, and/or using electrical components are discussed above with respect to FIG. 1, any of a variety of modular junction box assemblies including larger or smaller sizes, different shapes, additional mounting attachments, alternative electrical components, etc., as appropriate to the requirements of a specific application may be utilized in accordance with embodiments of the invention. Bus bar stack assemblies in accordance with embodiments of the invention are discussed further below.

Bus Bar Stack Assemblies

Figure 2:
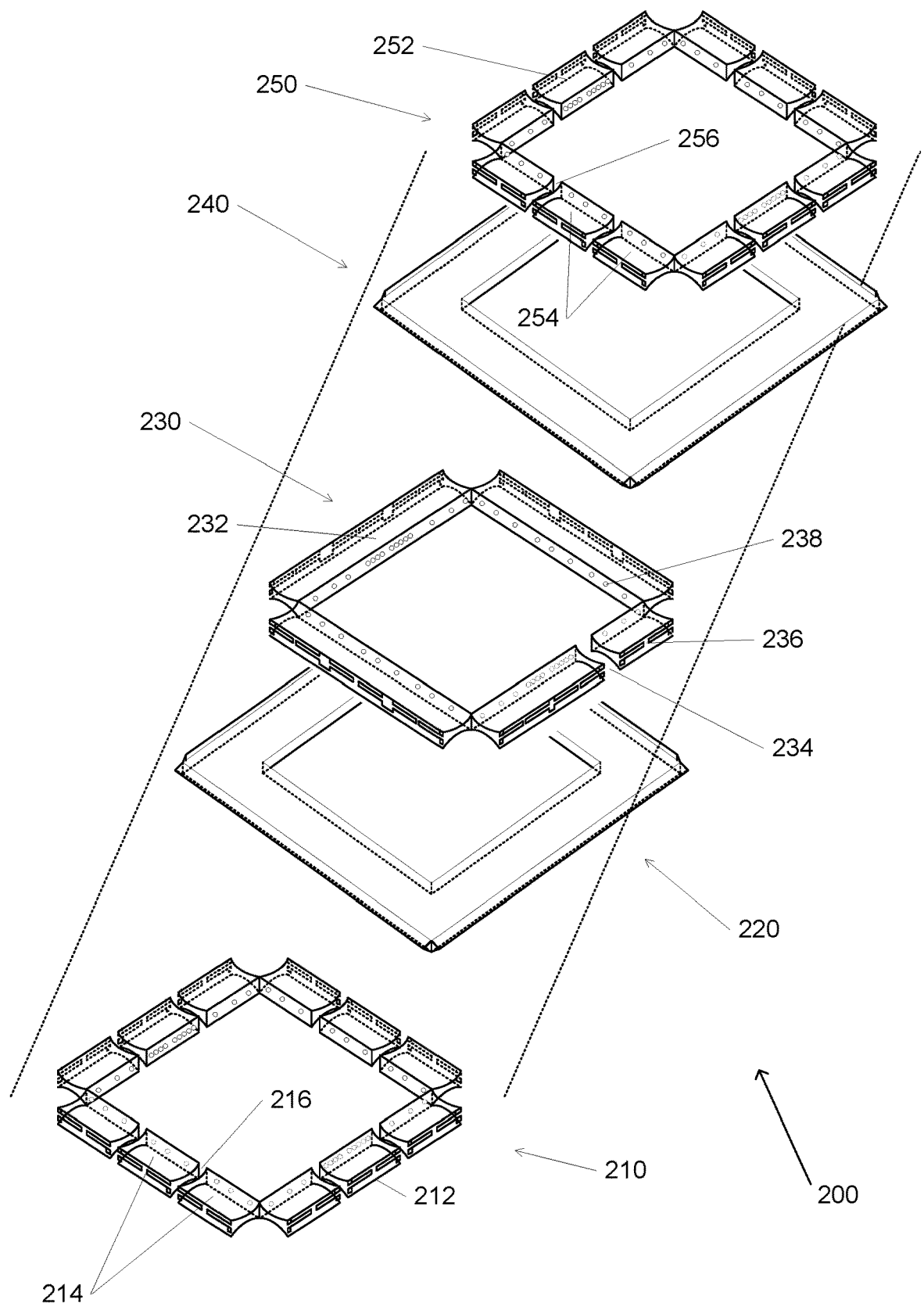
FIG. 2 is an exploded perspective view of a bus bar stack in accordance with an embodiment of the invention.

Bus bar stack assemblies may be utilized to distribute electricity throughout modular junction boxes to or from external wires and to or from one or more electrical components. An exploded perspective view of a bus bar stack in accordance with an embodiment of the invention is illustrated in FIG. 2. The bus bar stack 200 may include one or more bus bar layers 210, 230, 250. For example, the bus bar stack 200 may include a neutral bus bar layer 210, a ground bus bar layer 230, and a hot bus bar layer 250 (may be referred to collectively as "bus bar layers"). Although described in this order, in a variety of embodiments, the bus bar layers 210, 230, 250 may be placed on different levels. For example, the hot bus bar layer and neutral bus bar layer may be adjacent while the ground bus bar layer may be on the top or bottom level.

In reference to FIG. 2, the bus bar layers 210, 230, and 250 may correspond with electrical wires such as, but not limited to, hot, neutral, and ground wires found in some industrial wiring. For example, in some embodiments, the neutral bus bar layer 210 may be used as a neutral layer where a neutral wire may be attached. Further, the ground bus bar layer 230 may be used as a ground layer where a ground electrical wire may be attached. Furthermore, the hot bus bar layer 250 may be used as a hot layer where a hot electrical wire may be attached. In some embodiments, the bus bar stack 200 may include additional bus bar layers beyond those described in FIG. 2 to accomplish more complex circuit design, as further described below. In many embodiments, the bus bar stack 200 may also include one or more separation layers 220, 240 such that electricity is prevented from flowing between adjacent layers, as further described below.

In many embodiments, the bus bar layers 210, 230, 250 may include one or more home run zones 212, 232, 252. For example, the bus bar stack 200 may include a neutral home run zone 212, a ground home run zone 232, and a hot home run zone 252 (may be referred to collectively as "home run zones"). Similarly, the neutral bus bar layer 210 and the hot bus bar layer 250 may include one or more control zones 214, 254. In several embodiments, the one or more control zones 214, 254 may be separated by spaces 216, 256. For example, the spaces 216, 256 may include a gap between adjacent control zones 214, 254 and/or adjacent home run zones 212, 232 sufficient to block electricity from flowing between them. In many embodiments, the ground bus bar layer 230 may include a space 234 to preclude circular grounding routes. In other embodiments, the spaces 216, 234, 256, may also include an insulated material such as, but not limited to, rubber-like polymers, ceramics, composite materials, and/or various types of plastics. In many embodiments, the ground bus bar layer 230 may be a continuous layer.

In further reference to FIG. 2, the one or more control zones 214, 254 and the one or more home run zones 212, 232, 252 may include one or more input openings 236 and/or one or more output openings 238. For example, the one or more input openings 236 may accommodate one or more electrical wires, as further described below. Likewise, the one or more output openings 238 may accommodate one or more contact supports, as further described below.

In some embodiments, the home run zones 212, 232, 252 may be used as the primary internal source of electricity. For example, a set of electrical wires coming from a power source may be inserted into the one or more input openings 236 of the home run zones 212, 232, 252. Similarly, a set of the control zones 214, 254 may be used to distribute the electricity from the home run zones 212, 232, 252 to electrical components and/or outgoing electrical wires. For example, a first set of contact supports for a jumper device may be inserted into the one or more output openings 236 of the home run zones 212, 232, 252 and a second set of contact supports for the jumper device may be inserted into the one or more output openings 236 of the control zones 214, 254 in order to provide electricity from the home run zones 212, 232, 252 to the control zone 214. In some embodiments, a switch may be connected to the one or more output openings 236 of the home run zones 212, 232, 252, and the one or more output openings 236 of the control zones 214, 254 in order to provide a switched source of electricity to a set of electrical wires inserted into the one or more input openings 236 of the control zones 214, 254 and/or one or more electrical components.

Figure 3:
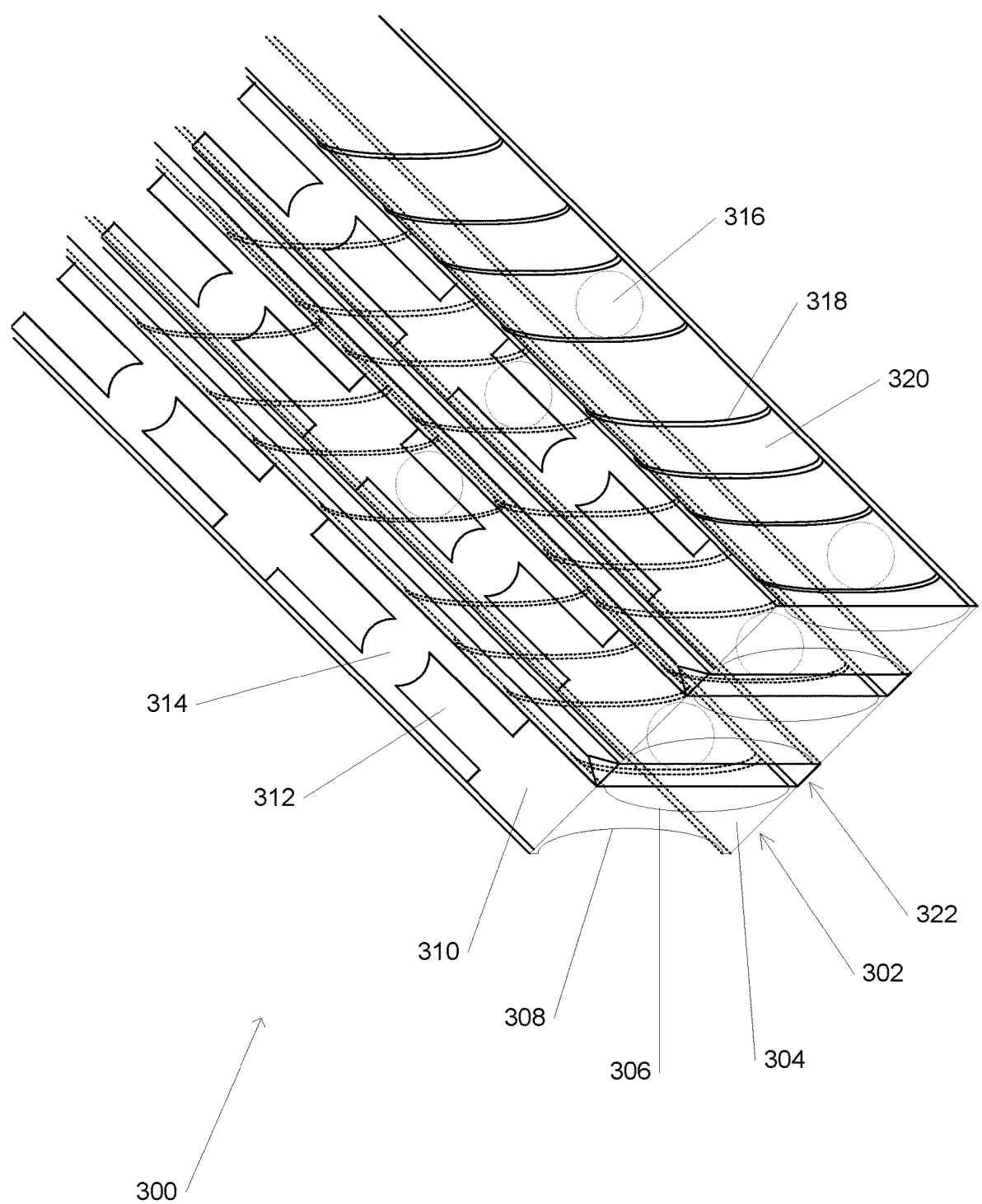
FIG. 3 is a front perspective view of a bus bar stack section in accordance with an embodiment of the invention.

As described above, bus bar stacks may include one or more layers capable of conducting electricity from an external wire to an internal contact post of an electrical component. A front perspective view of a bus bar stack section in accordance with an embodiment of the invention is illustrated in FIG. 3. The bus bar stack 300 may include one or more bus bar layers 302 separated by one or more separation layers 322 as further described above. In many embodiments, the bus bar layers 302 may be made from an electrically conductive material such as, but not limited to, metal and/or conductive polymers. For example, the bus bar layers 302 may be made from one or more rigid conductive metals in order to maintain a set shape while allowing for minimal deformation as described below. Similarly, the one or more separation layers 322 may be made from an electrically insulated material such as, but not limited to, rubber-like polymers, ceramics, composite materials, and/or plastics. For example, the separation layers 322 may be made from a rigid glass-reinforced plastic insulation in order to accept pressure from the bus bar layers 302 without deforming.

In many embodiments, the one or more bus bar layers 302 may be cut from a sheet of conductive material and folded into shape, as further described below. In some embodiments, the one or more bus bar layers 302 may be assembled from multiple pieces and joined together to accommodate electrical conductivity from one piece to the next. In several embodiments, the one or more bus bar layers 302 may be cut from a thick metal plate. In other embodiments, the one or more bus bar layers 302 may be a combination of cut plates and folded metal layers.

In reference to FIG. 3, the bus bar layers 302 may form a substantially rectangular hollow volume with electrically conductive sides. For example, the hollow rectangular volume of the bus bar layers 302 may be formed by two opposing concave sides 306, 308 and two substantially flat sides 304, 310. In several embodiments, the hollow rectangular volume of the bus bar layers 302 may be formed by multiple concave sides distributed horizontally in the same plane as the bus bar layers 302. In some embodiments, the vertex of the two opposing concave sides 306, 308 may define a distance similar to the diameter of an electrical wire and/or a contact support to accommodate an electrical connection when an electrical wire and/or a contact support is placed between the two opposing concave sides 306, 308.

In many embodiments, the two substantially flat sides 304, 310 may include one or more input openings 314 and one or more output openings 316. In some embodiments, the one or more input openings 314 may be formed by a flexible wire gate 312. For example, the flexible wire gate 312 may include opposing swinging arms capable of bending inward. In many embodiments, the flexible wire gate 312 may form a narrower diameter than that of an electrical wire in order to deform inwards when a wire is pushed through it, but resist the movement of a wire in the opposite direction. In several embodiments, the flexible wire gate 312 may include a release mechanism to allow the wire to be removed, as further described below. In other embodiments, the bus bar stack 300 may include a tightening device such as, but not limited to, a screw to compress the bus bar layers 302 to secure one or more electrical wires.

In further reference to FIG. 3, the two opposing concave sides 306, 308 may include one or more matching cuts 318 on each side running from the first substantially flat side to the second substantially flat side. In some embodiments, the matching cuts 318 may form one or more matching spring sections 320 on each of the two opposing concave sides 306, 308. In other embodiments, the matching spring sections 320 may be formed by multiple concave sides distributed horizontally in the same plane as the bus bar layers 302. In many embodiments, one or more of the matching spring sections 320 may be aligned with the one or more input openings 314 and/or the one or more output openings 316 in order to apply uniform pressure from one opening to the next.

Although specific bus bar layers for accepting, securing, and conducting electricity to and/or from wires and/or contact supports are discussed above with respect to FIG. 3, any of a variety of bus bar stack layers including different shapes, alternative opening sizes, wire clamps, etc., as appropriate to the requirements of a specific application can be utilized in accordance with embodiments of the invention.

Figure 4:
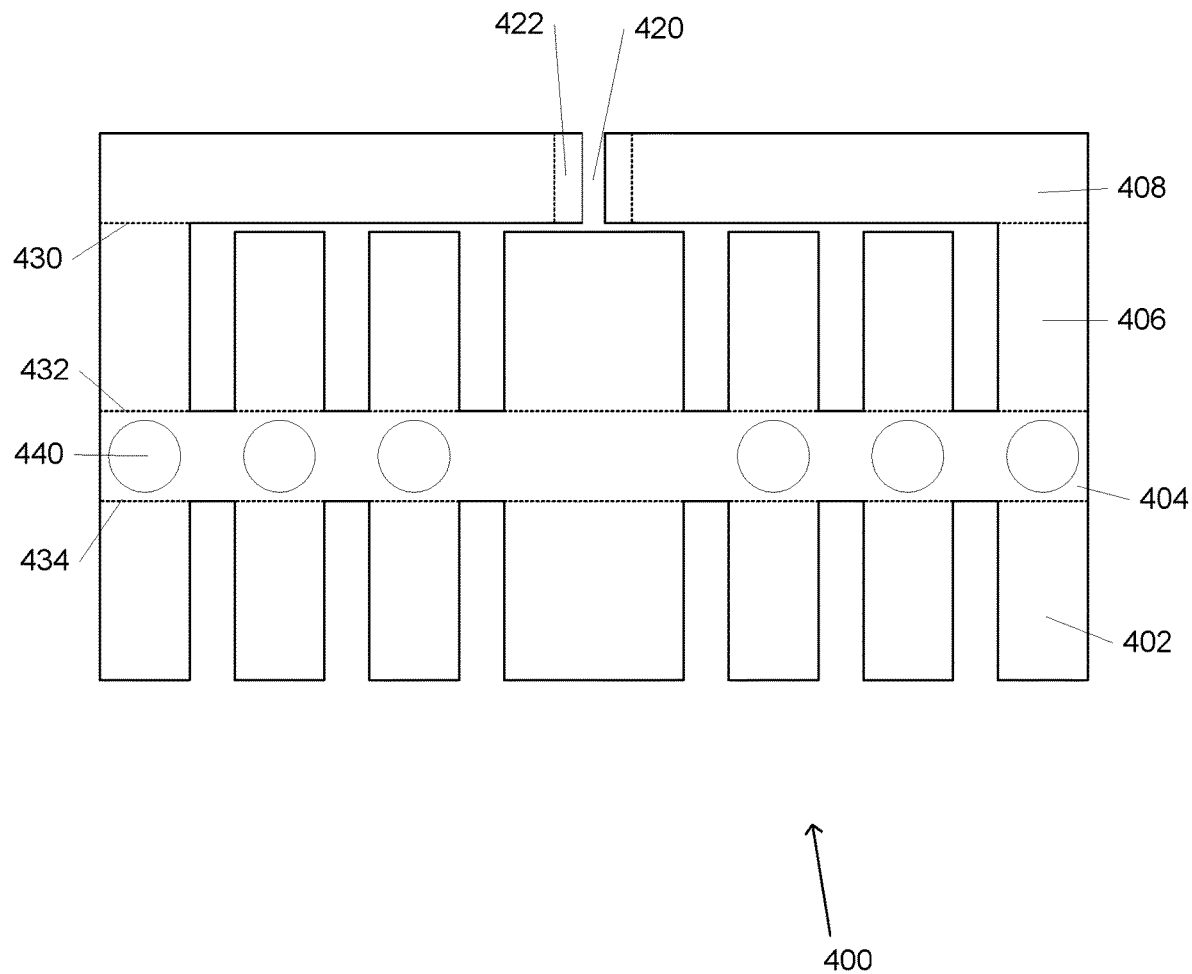
FIG. 4 is a top perspective view of a prefabricated bus bar layer in accordance with an embodiment of the invention.

As described above, a bus bar layer may be made by forming, sintering, casting, and/or cutting a pattern out of a piece of conductive material which may then be folded or stamped to form the shape of the bus bar layer. In addition, the bus bar can be made by riveting, punching, stamping or otherwise mechanically fastening various formed pieces together. A top perspective view of a prefabricated bus bar layer prior to folding in accordance with an embodiment of the invention is illustrated in FIG. 4. The prefabricated bus bar layer 400 may include multiple cuts depicted by the solid lines in the figure as well as multiple folds as depicted by the dashed lines on the figure. In many embodiments, the prefabricated bus bar layer 400 may be folded along predefined fold lines 430, 432, 434 to form a bottom side 402, a back side 404, a top side 406, and a front side 408. In various embodiments, the bottom side 402 and the top side 406 may be molded to form a concave shape. Additionally, one or more output openings 440 may be made to accommodate the diameter of one or more contact supports. Similarly, the front side 408 may include one or more input openings 420 formed by one or more flexible wire gates 422.

Although specific bus bar stack assemblies for accepting, separating, and/or distributing electricity from a source to one or more electrical components are discussed above with respect to FIGS. 2-4, any of a variety of bus bar stack assemblies including larger or smaller sizes, different shapes, alternative materials, etc., as appropriate to the requirements of a specific application can be utilized in accordance with embodiments of the invention. Cable wedge clamp assemblies in accordance with embodiments of the invention are discussed further below.

Cable Clamp Assemblies

Figure 5:
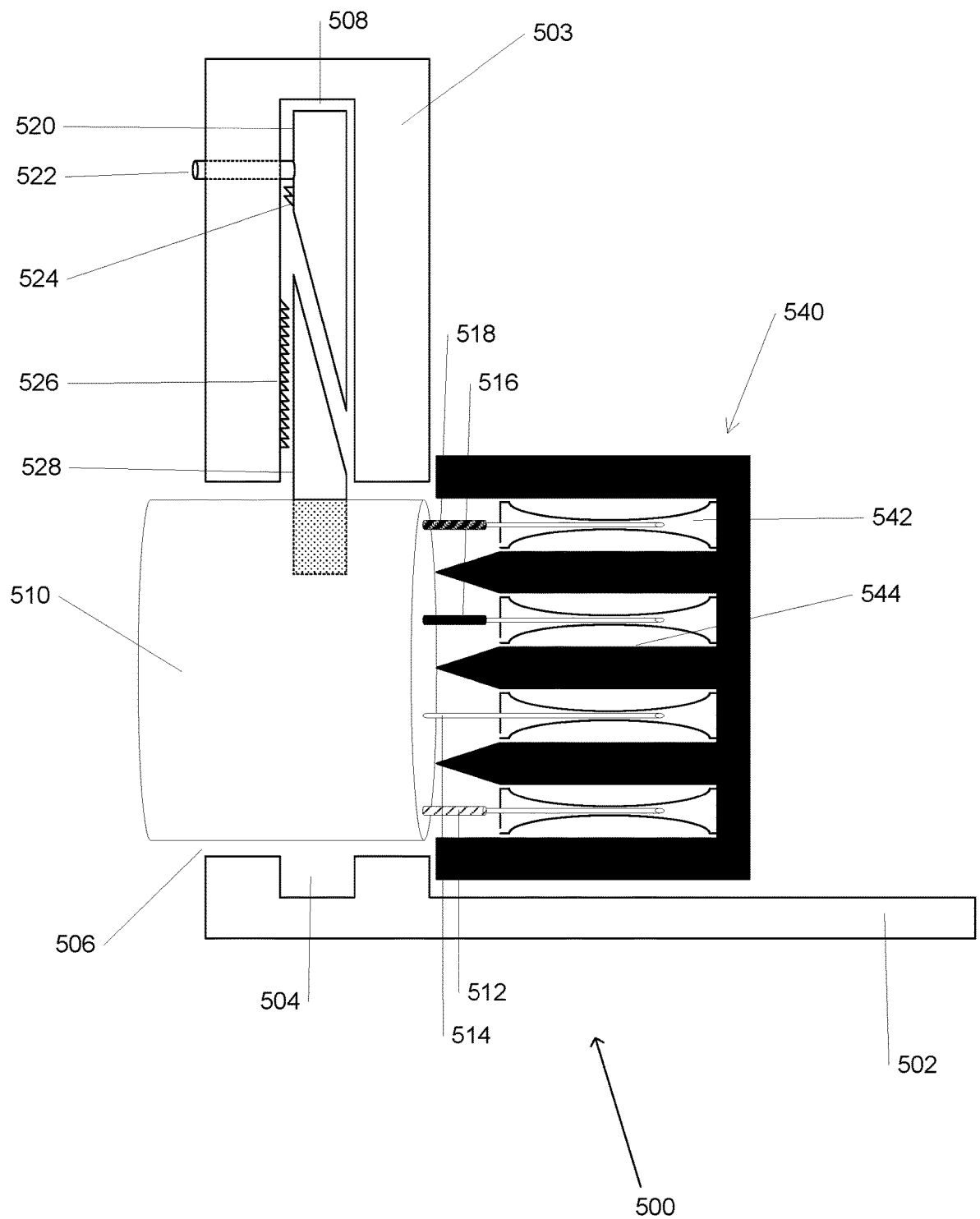
FIG. 5 is a cross section view of a wired bus bar stack and cable clamp assembly in accordance with an embodiment of the invention.

Cable clamp assemblies may be utilized to secure electrical cables and/or separate the enclosed wires entering junction. A cross section view of a wired bus bar stack and cable clamp assembly in accordance with an embodiment of the invention is illustrated in FIG. 5. The assembly 500 may include a housing 502 that may form the external structure of the assembly 500. In many embodiments, a clamp housing 503 may be affixed to the inside of the housing 502. The clamp housing 503 may include a lower clamp channel 504 and an upper clamp channel 508. In various embodiments, the lower clamp channel 504 and the upper clamp channel 508 may form a cable opening 506 that may allow a cable 510 to pass through.

In some embodiments, the upper clamp channel 508 and lower clamp channel 504 may contain an upper clamp 520 and a lower clamp 528. In several embodiments, the upper clamp 520 and lower clamp 528 may form matching wedges. In many embodiments, the upper clamp 520 may include a thumb post 522 that may pass through the housing 502 allowing a user to slide the upper clamp 520 along the upper clamp channel 508. For example, as the upper clamp 520 slides along the upper clamp channel 508, the upper clamp 520 may engage with the lower clamp 528 causing the lower clamp 528 to move in a perpendicular direction and press against the cable 510. In some embodiments, the upper clamp 520 and the upper clamp channel 508 may have matching teeth 524, 526 that may allow the upper clamp 520 to pass in one direction uninhibited while restricting the same movement in the opposite direction. In some embodiments, the matching teeth 524, 526 may be placed in intervals corresponding with a variety of sizes for the cable 510. For example, a first set of teeth 526 may cause the lower clamp 528 to create a first diameter of the cable opening 506 consistent with a first cable size and a second set of teeth 526 may cause the lower clamp 528 to create a second diameter of the cable opening 506 consistent with a second, smaller, cable size. In many embodiments, the upper clamp channel 508 may allow the upper clamp 520 to be pushed inwards to disengage the matching teeth 524, 526. Although described as having a vertical movement, in a variety of embodiments, the upper clamp channel 508 and lower clamp channel 504 may be oriented to accommodate a horizontal movement of the upper clamp 520. Similarly, while described as a sliding clamp mechanism, the clamp housing 503 may contain a rotating cam clamp. For example, when the rotating cam clamp is placed in a locked position, the rotating cam clamp may press against the cable 510 while also causing a wedge to be driven into the bus bar stack 540 causing it to secure the one or more wires 512, 514, 516, 518.

In reference to FIG. 5, the assembly 500 may also include a bus bar stack 540. In many embodiments, the bus bar stack 540 may include one or more bus bar layers 542 and/or one or more separation layers 544 as further described above. In several embodiments, the cable 510 may include one or more wires 512, 514, 516, 518 corresponding to the one or more bus bar layers 542. In some embodiments, the outside edge of the one or more separation layers 544 may be tapered to help separate the one or more wires 512, 514, 516, 518 into their respective one or more bus bar layers 542. In some embodiments, the upper clamp 520 may include one or more bus bar release wedges that may engage with one or more bus bar release pins on the external face of the flexible wire gates of the bus bar layers 542 to release the one or more wires 512, 514, 516, 518. For example, as the upper clamp 520 reaches a set position, the bus bar release wedge may press against the input openings of the bus bar stack 540 to release the wires 512, 514, 516, 518 and allow the wires 512, 514, 516, 518 to be removed from the bus bar stack 540.

Figure 6:
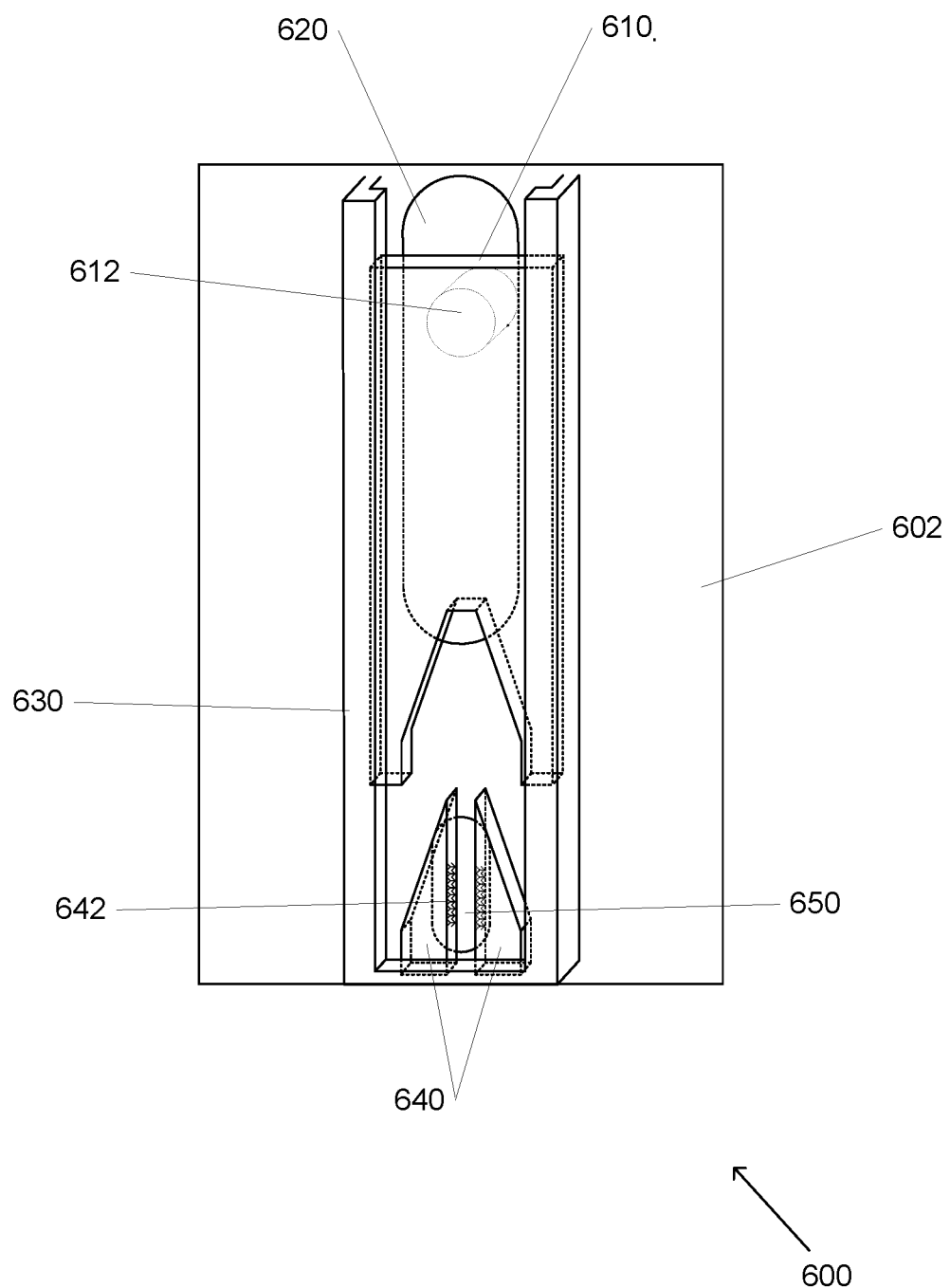
FIG. 6 is a rear perspective view of a cable clamp assembly in accordance with an embodiment of the invention.

A rear perspective view of a cable clamp assembly in accordance with an embodiment of the invention is illustrated in FIG. 6. The assembly 600 may include a housing 602 that may form the external structure of the assembly 600. In many embodiments, the housing 602 may form one or more rails 630, a thumb post opening 620, and a cable opening 650. In various embodiments, the one or more rails 630 may hold an upper clamp 610 and one or more lower clamps 640. In many embodiments, the one or more lower clamps 640 may be formed from connected wedges. For example, the one or more lower clamps 640 may be connected by a spring to keep the one or more lower clamps 640 separated when there is no pressure applied to them. In some embodiments, the one or more lower clamps 640 may have ridges 642 allowing the one or more lower clamps 640 to grip a cable sheath. In several embodiments, the upper clamp 610 may include a thumb post 612 that may pass through the thumb post opening 620 of the housing 602 allowing a user to slide the upper clamp 610 along the one or more rails 630. In some embodiments, as the upper clamp 610 slides along the rails 630, it may engage with the one or more lower clamps 640 causing the one or more lower clamps 640 to move in a perpendicular direction and press against a cable.

Although cable clamp assemblies for accepting, separating, and/or securing a cable and wires to the junction box are discussed above with respect to FIGS. 5 and 6, any of a variety of cable clamp assemblies including cable openings for various cable and/or wire diameters, alternative clamp mechanisms, single clamps, etc., as appropriate to the requirements of a specific application can be utilized in accordance with embodiments of the invention. Interchangeable electrical components in accordance with embodiments of the invention are discussed further below.

Interchangeable Electrical Component Assemblies

Figure 7:
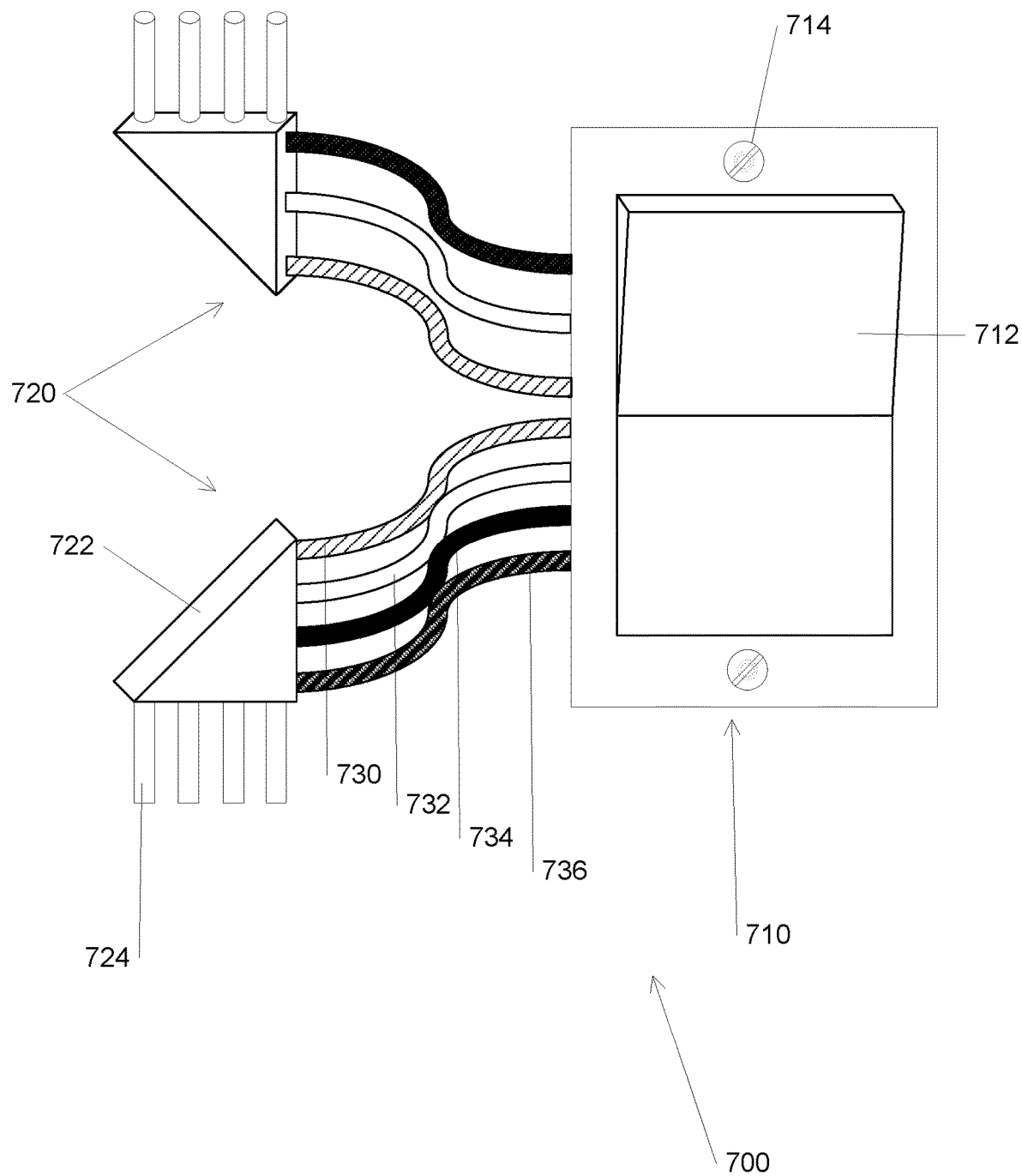
FIG. 7 is a front perspective view of a prewired light switch assembly in accordance with an embodiment of the invention.

Interchangeable electrical components may be utilized to quickly connect electronic components capable of distributing and/or controlling the flow of electricity from junction boxes to electrical equipment. A front perspective view of a prewired light switch assembly in accordance with an embodiment of the invention is illustrated in FIG. 7. The prewired light switch assembly 700 may include a light switch 710. In many embodiments, the light switch 710 may include one or more actuators 712. For example, the one or more actuators may include toggles, rockers, push buttons, etc. In some embodiments, the one or more actuators 712 may control a variety of switch controls such as, but not limited to, single pole single throw, single pole double throw, and/or double pole double throw. In some embodiments, the light switch 710 may include a dimmer control circuit. In many embodiments, the light switch 710 may include one or more fasteners 714. For example, the one or more fasteners 714 may include screws, push pins, nuts, bolts, etc. In some embodiments, the one or more fasteners 714 may attach the light switch 710 to a junction box, as further described below.

In reference to FIG. 7, the assembly 700 may also include one or more wiring assemblies 720 connected to the light switch 710. In many embodiments, at least one of the one or more wiring assemblies 720 may be a source assembly while another of the one or more wiring assemblies 720 may be a control assembly. For example, in some embodiments, the incoming source assembly may be electrically connected to an electrical panel or other power source while the outgoing control assembly may be electrically connected to a light fixture and/or an electrical outlet as described below. Alternatively, in some embodiments, one of the one or more wiring assemblies 720 may be a traveler assembly while another of the one or more wiring assemblies 720 may be an additional traveler assembly or a control assembly to accommodate such circuits as, but not limited to, three-way and four-way switches.

In further reference to FIG. 7, the one or more wiring assemblies 720 may include one or more wires. In many embodiments, the one or more wires may include a neutral wire 730, a ground wire 732, and a hot wire 734. For example, in many embodiments, the neutral wire 730, the ground wire 732, the hot wire 734 may each be electrically coupled to the corresponding neutral, ground, and hot wires entering and/or leaving the junction box through a bus bar stack as further described above. In some embodiments, the one or more wiring assemblies 720 may also include a second hot wire 736 as necessary to accommodate different varieties of switches such as, but not limited to, three-way and four-way switches. Although described as a wire, in a variety of embodiments, the one or more wiring assemblies 720 may include other electrical conductors such as, but not limited to, bars and/or conductive polymers.

In many embodiments, the one or more wiring assemblies 720 may include one or more contact supports 724 electrically coupled to the one or more wires such as, but not limited to, banana plugs, pin plugs, and/or pin headers. In some embodiments, the one or more contact supports 724 may be held in place by a housing 722. The housing 722 may also support the electrical connection between the one or more wires and the one or more contact supports 724. In many embodiments, the one or more contact supports may exit the housing 722 at an angle from the one or more wires such that the one or more contact supports 724 may only be connected to the junction box from a single orientation. In other embodiments, the housing 722 may form a substantially triangular shape such that the one or more contact supports 724 may only be connected to the junction box from a single orientation. For example, in some embodiments, the bus bar stack, as described above, may be connected to the power source such that the lowest layer is neutral, the middle layer is ground, and the top layer is hot and the one or more contact supports 724 may only be inserted in a single orientation such that the neutral wire 730 is connected through one of the one or more contact supports 724 to the bottom layer, the ground wire 732 is connected through one of the one or more contact supports 724 to the middle layer, and the hot wire 734 is connected through one of the one or more contact supports 724 to the top layer.

Figure 8:
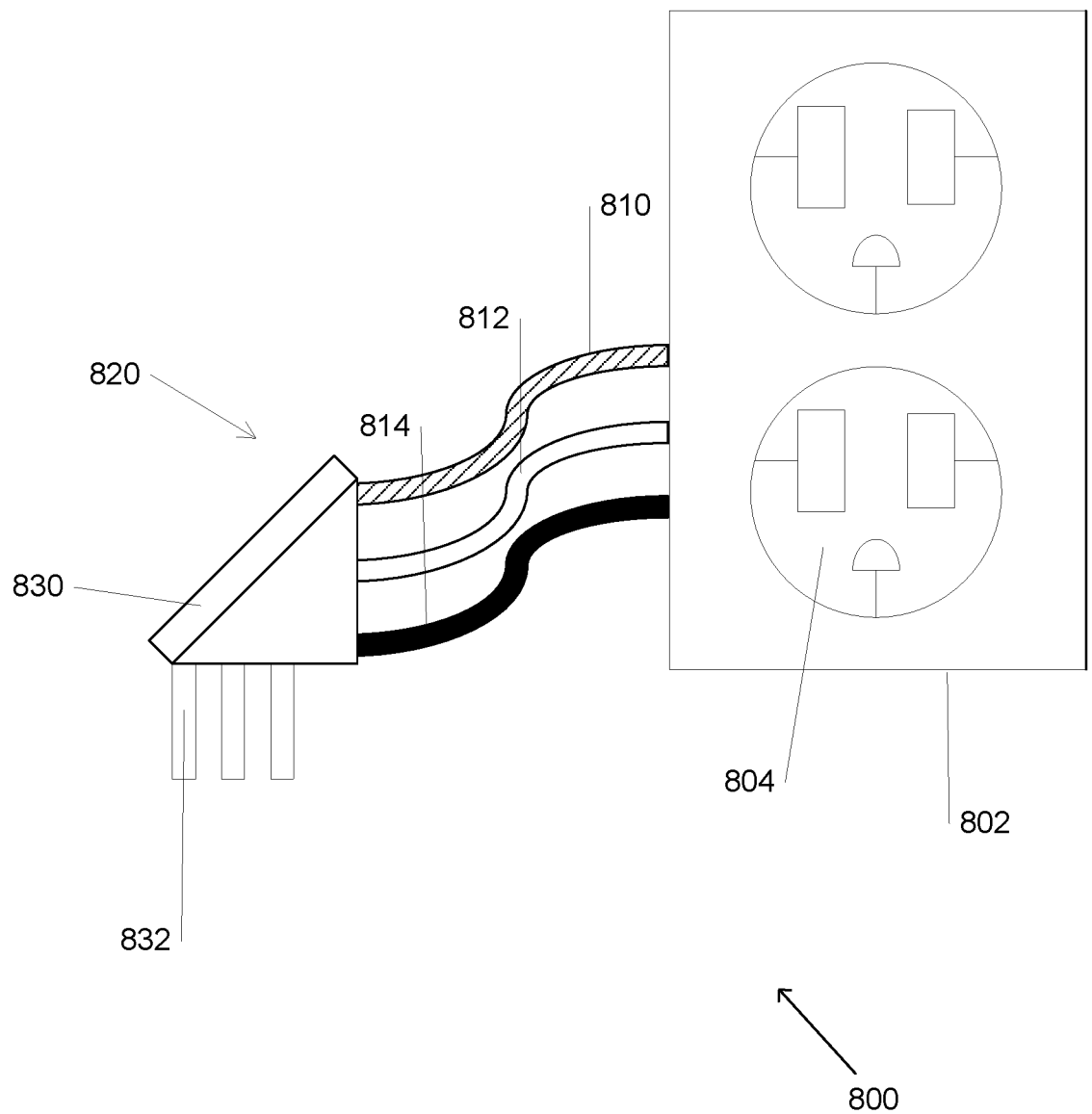
FIG. 8 is a front perspective view of a prewired electrical outlet assembly in accordance with an embodiment of the invention.

A front perspective view of a prewired electrical outlet assembly in accordance with an embodiment of the invention is illustrated in FIG. 8. The prewired electrical outlet assembly 800 may include an electrical outlet 802. In many embodiments, the electrical outlet 802 may include one or more receptacles 804. The one or more receptacles 804 may accommodate a variety of plugs such as, but not limited to, two-prong, three-prong, four-prong, and/or usb. In some embodiments, the electrical outlet 802 may include AFCI and/or GFCI technology.

In reference to FIG. 8, the assembly 800 may include one or more wiring assemblies 820 connected to the electrical outlet 802. For example, one of the one or more wiring assemblies 820 may be electrically connected to an electrical panel or other power source. In many embodiments, the one or more wiring assemblies 820 may include one or more wires. In several embodiments, the one or more wires may include a neutral wire 810, a ground wire 812, and a hot wire 814. For example, the neutral wire 810, the ground wire 812, and the hot wire 814 may each be electrically coupled to the corresponding neutral, ground, and hot wires, respectively entering the junction box from a power source through a bus bar stack as further described above. In some embodiments, the one or more wiring assemblies 820 may also include a second hot wire to accommodate one or more switched receptacles and/or one or more hot receptacles. Although described as a wire, in a variety of embodiments, the one or more wiring assemblies 820 may include other electrical conductors such as, but not limited to, bars and/or conductive polymers.

In many embodiments, the one or more wiring assemblies 820 may include one or more contact supports 832 electrically coupled to the one or more wires such as, but not limited to, banana plugs, pin plugs, and/or pin headers. In some embodiments, the one or more contact supports 832 may be held in place by a housing 830. The housing 830 may also support the electrical connection between the one or more wires and the one or more contact supports 832. In many embodiments, the one or more contact supports may exit the housing 830 at an angle from the one or more wires such that the one or more contact supports 832 may only be connected to the junction box from a single orientation. In other embodiments, the housing 830 may form a substantially triangular shape such that the one or more contact supports 832 may only be connected to the junction box from a single orientation. For example, in some embodiments, a bus bar stack may be connected to the power source such that the lowest layer is neutral, the middle layer is ground, and the top layer is hot and the one or more contact supports 832 may be inserted in a single orientation such that the neutral wire 810 is connected through one of the one or more contact supports 832 to the bottom layer, the ground wire 812 is connected through one of the one or more contact supports 832 to the middle layer, and the hot wire 814 is connected through one of the one or more contact supports 832 to the top layer.

Although interchangeable electronic component assemblies for distributing and/or controlling the flow of electricity from junction boxes to electrical equipment are discussed above with respect to FIGS. 7 and 8, any of a variety of interchangeable electronic component assemblies including jumpers, light sockets, circuit breakers, etc., as appropriate to the requirements of a specific application can be utilized in accordance with embodiments of the invention. Electrical component fastener assemblies in accordance with embodiments of the invention are discussed further below.

Electrical Component Push-in Fastener Assemblies

Figure 9A:
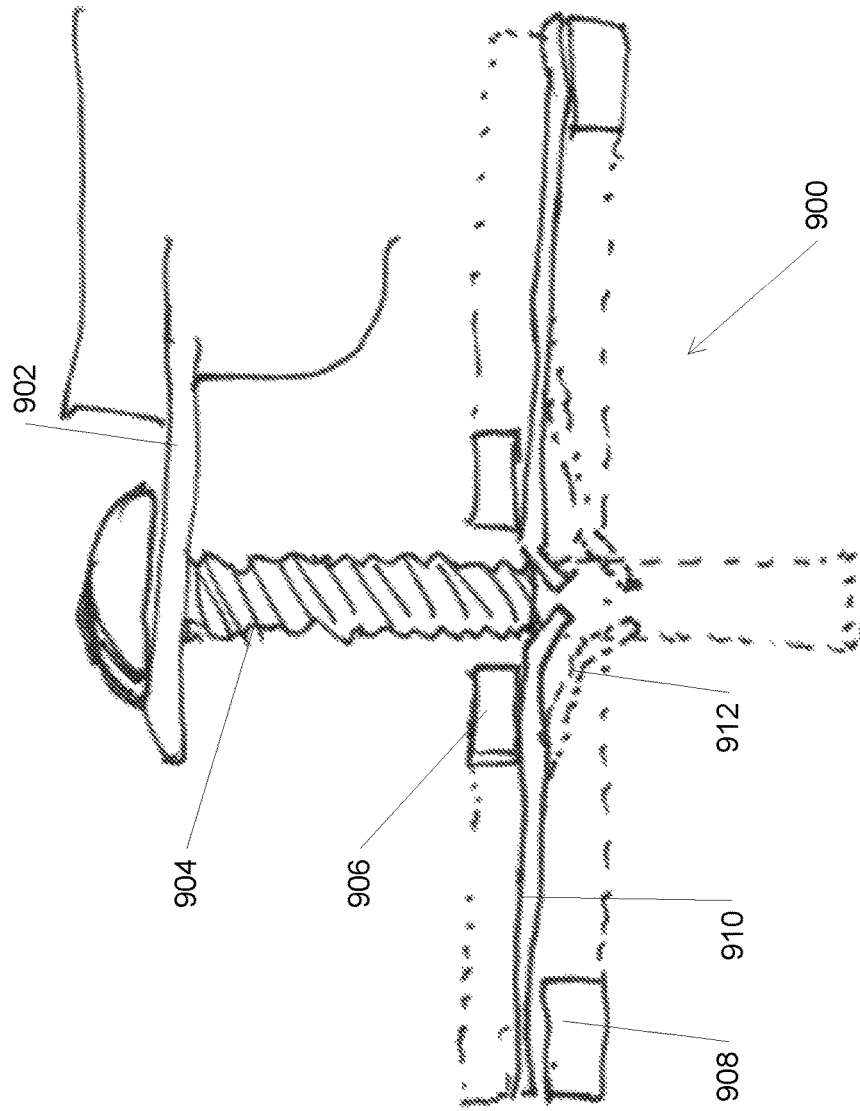
FIGS. 9A-C illustrate embodiments of push-in fastener assemblies in accordance with an embodiment of the invention.
Figure 9B:
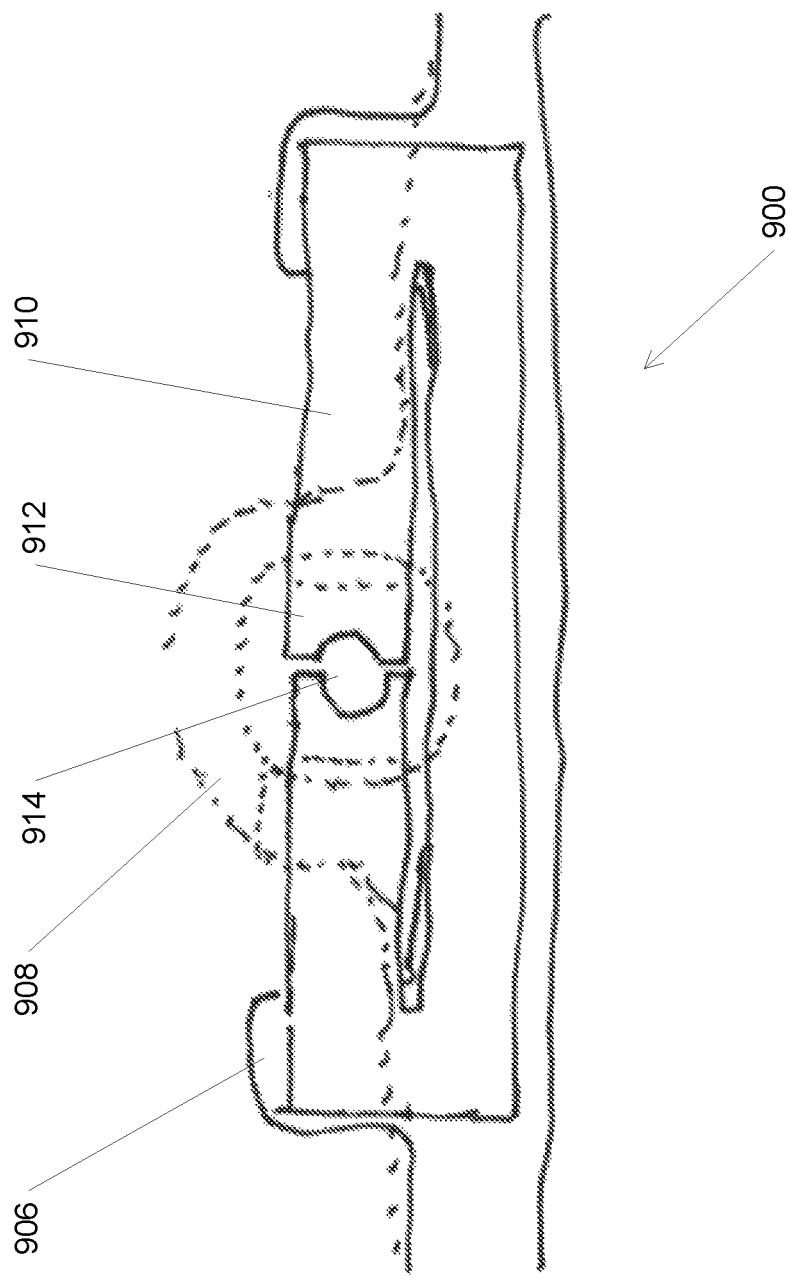
Figure 9C:
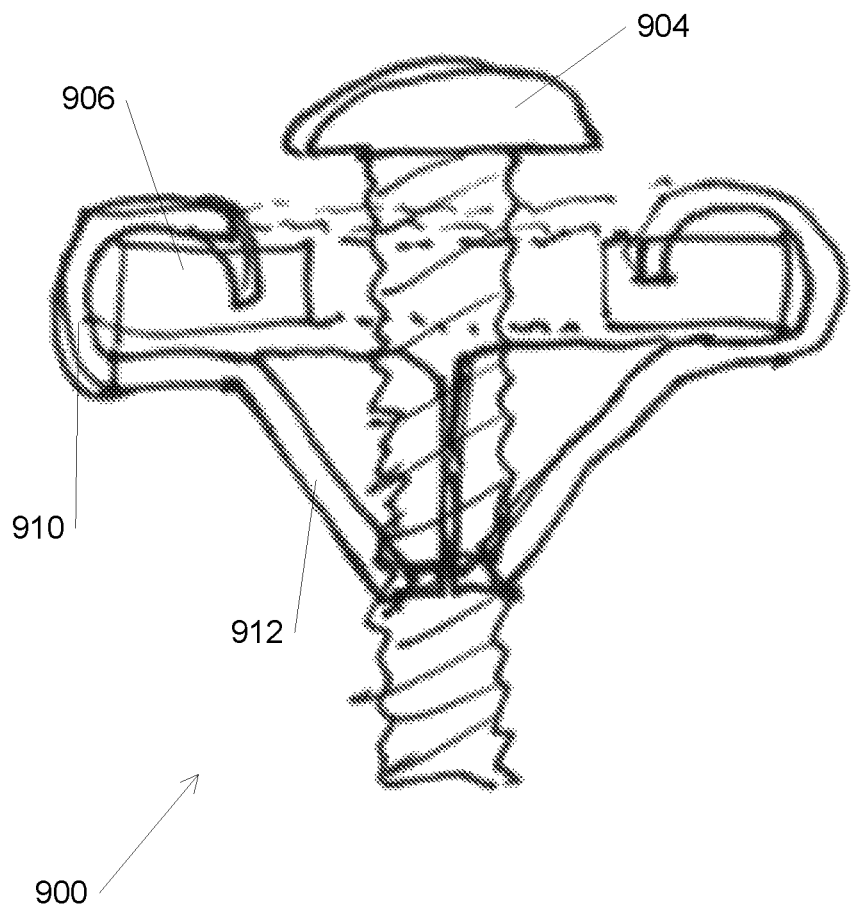

Electrical component push-in fastener assemblies may be utilized to quickly attach electrical components to junction boxes. Push-in fastener assemblies in accordance with an embodiment of the invention are illustrated in FIGS. 9A-C. The push-in fastener assembly 900 may include a spring layer 910 supported by a top support layer 906 and a bottom support layer 908 (may be referred to collectively as "support layers"). In many embodiments, the support layers 906, 908 may be a part of the overall junction box housing as further described above. In several embodiments, the spring layer 910 may be supported by a single support layer 906. For example, the spring layer 910 may wrap around and crimp into a support layer 906. In some embodiments, the support layers 906, 908 may be made from a different material than the junction box housing. For example, the support layers 906, 908 may be made from a substantially rigid material such as, but not limited to, a hard plastic and/or a hard metal. In many embodiments, the spring layer 910 may be made from a thin layer of material capable of deformation while returning to its original shape such as, but not limited to, spring steel. In some embodiments, the spring layer 910 may be thinner than the threading on a threaded fastener such as, but not limited to, a screw, a bolt, a push pin, etc.

In reference to FIGS. 9A-C, the spring layer 910 may have an opening 914 defined by one or more bended flaps 912. In some embodiments, the one or more bended flaps 912 may allow a threaded fastener 904 attached to an electrical component 902 to be pushed through the opening defined by the one or more bended flaps 912 in one direction while restricting movement of the fastener in the opposite direction. Although electrical component fastener assemblies for attaching electrical components to junction boxes are discussed above with respect to FIGS. 9A-C, any of a variety of electrical component fastener assemblies including alternative fasteners, threaded nuts, etc., as appropriate to the requirements of a specific application can be utilized in accordance with embodiments of the invention.

What is claimed is:

1. A junction box for convenient modular industrial wiring, comprising:
   a plurality of walls defining a first internal space of the junction box and at least one open face, wherein the at least one open face is a wall face that exposes the first internal space of the junction box;
   a first connection area located on a first external face of the junction box, the first connection area comprising a first opening for receiving at least three electrical wires;
   a bus bar stack located in the first internal space of the junction box, wherein the bus bar stack comprises:
      at least three input openings aligned with the first opening, each of the at least three input openings comprising a connector for receiving an electrical wire of the at least three electrical wires and holding the electrical wire stationary while conducting electricity from the electrical wire to the bus bar stack;
      at least three output openings facing towards the first internal space, wherein the at least three output openings are accessible via the at least one open face, and wherein each of the at least three output openings comprises a mechanical connector for conducting electricity from the bus bar stack to at least one contact support and further for securely holding the at least one contact support within each of the at least three output openings;
   wherein the bus bar stack is configured to receive a removable electrical component comprising the at least one contact support, the at least one contact support being mechanically and electrically attachable to one of the at least three output openings of the bus bar stack; and
   wherein when the removable electrical component is attached to the bus bar stack, the removable electrical component is electrically connected through the at least one contact support to one of the at least three input openings.

2. The device of claim 1, wherein the first opening receives a non-metallic sheathed cable comprising at least two insulated conductors.

3. The device of claim 1, wherein the first external wall has a set of markings adjacent the first connection area corresponding to a correct orientation of the at least three wires prior to being inserted into the first connection area.

4. The device of claim 1, wherein the first opening further comprises a clamp for securing the at least three wires in the first opening.

5. The device of claim 4, wherein the clamp further comprises at least two clamp settings corresponding to at least two opening dimensions.

6. The device of claim 1, wherein the at least three input openings further comprise a flexible wire gate wherein when a wire is pushed into the flexible wire gate, the flexible wire gate deforms to allow the wire to pass through, and wherein when the wire is pulled out, the flexible wire gate resists the movement of the wire.

7. The device of claim 1, wherein the bus bar stack further comprises at least three bus bar layers.

8. The device of claim 7, wherein at least one of the at least three bus bar layers extends along the interior of each of the plurality of walls.

9. The device of claim 7, wherein each of the at least three bus bar layers of the bus bar stack further comprise a hollow rectangular volume with electrically conductive sides.

10. The device of claim 9, wherein the hollow rectangular volume is formed by two opposing concave sides and two substantially flat sides, and wherein one of the at least three input openings are located on a first substantially flat side, one of the at least three output openings are located on a second substantially flat side opposite the first substantially flat side, and the two remaining opposing side form a concave shape toward a center of the rectangular volume.

11. The device of claim 10, wherein the two opposing concave sides further comprise a set of matching cuts on each of the two opposing concave sides running from the first substantially flat side to the second substantially flat side.

12. The device of claim 11, wherein the at least two electrically insulated separation layers are substantially rigid.

13. The device of claim 7, wherein the bus bar stack further comprises at least two electrically insulated separation layers separating the at least three bus bar layers from each other, wherein when a first wire is inserted into a first layer of the bus bar stack and a second wire is inserted into a second layer of the bus bar stack, the first and second wires do not complete a circuit.

14. The device of claim 1, wherein the junction box further comprises a second connection area located on a second external face of the junction box adjacent the first external face, the second connection area comprising a second opening for receiving at least three electrical wires.

15. The device of claim 1, wherein the junction box further comprises a push-in fastener for attaching the removable electrical component to the open face of the junction box, and wherein the removable electrical component may be securely attached by applying a force to the removable electrical component towards the junction box.

16. The device of claim 1, wherein the removable electrical component further comprises a housing around the at least one electrical contact support, and wherein the housing allows for the removable electrical component to be attached to the bus bar stack from a single orientation.

17. The device of claim 1, wherein the junction box further comprises at least one anchor located on an external wall of the junction box for securely attaching the junction box to a separate surface.

18. The device of claim 1, wherein the removable electrical component further comprises a light switch.

19. The device of claim 1, wherein the removable electrical component further comprises an electrical outlet.

20. The device of claim 1, wherein the removable electrical component further comprises a jumper for connecting a first location of the bus bar stack to a second location of the bus bar stack.

* * * * *